United States Patent [19]
Gaffney

[11] Patent Number: 5,853,346
[45] Date of Patent: Dec. 29, 1998

[54] PLANETARY GEAR ASSEMBLY WITH FLOATING RING GEAR

[76] Inventor: Edward J. Gaffney, N26 N27293 Hwy. SS, Pewaukee, Wis. 53072

[21] Appl. No.: 575,038

[22] Filed: Dec. 19, 1995

[51] Int. Cl.$^6$ ............................... F16H 3/72; F16H 57/08
[52] U.S. Cl. ............................. 475/346; 475/1; 475/331
[58] Field of Search ................... 475/1, 346, 331, 475/329, 2, 3, 4, 5, 7

[56] References Cited

U.S. PATENT DOCUMENTS

| | | | |
|---|---|---|---|
| 1,395,004 | 10/1921 | Norelius . | |
| 1,435,821 | 11/1922 | Dorsey | 475/331 |
| 1,483,959 | 2/1924 | Welch . | |
| 1,828,947 | 10/1931 | Rossman | 475/5 |
| 2,027,218 | 1/1936 | Armington . | |
| 2,546,869 | 3/1951 | Przybylski | 475/1 |
| 3,159,084 | 12/1964 | Zeigler et al. . | |
| 3,351,149 | 11/1967 | Lundin et al. . | |
| 3,395,671 | 8/1968 | Zimmerman, Jr. . | |
| 3,450,218 | 6/1969 | Looker . | |
| 3,530,741 | 9/1970 | Charest . | |
| 4,674,360 | 6/1987 | Matoba | 475/331 |
| 4,813,506 | 3/1989 | Smith | 180/6.44 |
| 4,901,602 | 2/1990 | Matoba | 475/331 |
| 5,004,060 | 4/1991 | Barbagli et al. | 180/6.44 |
| 5,186,692 | 2/1993 | Gleasman et al. | 475/82 |

Primary Examiner—Charles A. Marmor
Assistant Examiner—Sherry Lynn Estremsky
Attorney, Agent, or Firm—Ryan Kromholz & Manion

[57] ABSTRACT

A propelling and/or steering mechanism uses a planetary gear set and ring gear arrangement, in which the ring gear "floats" upon the planetary gear set, free of a center hub and a bearing connection.

14 Claims, 8 Drawing Sheets

PLANETARY GEAR ASSEMBLY WITH FLOATING RING GEAR

FIELD OF THE INVENTION

The invention generally relates to propulsion mechanisms employing sun and planet gear assemblies. In a more particular sense, the invention relates to steering control and propulsion mechanisms for smaller, usually battery-powered vehicles, such as golf carts, wheel chairs, and portable personal mobility scooters for physically challenged individuals.

BACKGROUND OF THE INVENTION

Drive mechanisms are known that use a planetary gear system driven by a central sun gear. Typically, the central sun gear is coupled to a propulsion unit, like an engine or motor, and the planetary gear system is coupled to an output drive shaft. The sun gear, driven by the propulsion unit, imparts rotation to the drive shaft through the planetary gears.

It is desirable to adjust the speed of the drive shaft without modifying the speed of the propulsion unit. To accomplish this, a ring gear is coupled to the periphery of the planetary gear system. A second propulsion unit imparts rotation to the ring gear concurrent with rotation of the planetary gear system imparted by the main propulsion unit through the sun gear. The concurrent rotation alters the rotational speed of the output drive shaft, while the speed of the main propulsion unit remains constant.

Several independent sets of planetary gears can be used in tandem to impart rotation from a single main propulsion unit to several output drive shafts. A ring gear coupled to one or more of the independent planetary gear sets, can impart a greater speed of rotation to one planetary gear set than to the other, thereby steering the vehicle.

There is a need to axially retain the ring gear in position about the planetary gear set. Typical mechanisms hold the ring gear from moving axially along the drive shaft axis by mechanically mounting the center hub of the ring gear on bearings attached to the drive shaft. This arrangement adds one more mechanical component to the already complex structure of a typical planetary gear system.

There is a need for more compact, less complicated, and lighter weight planetary gear systems. These attributes are important, particularly with respect to smaller, typically battery powered vehicles, like wheelchairs or golf carts or personal mobility scooters.

SUMMARY OF THE INVENTION

The present invention provides a propelling and/or steering mechanism utilizing a planetary gear set and ring gear arrangement that is more compact, less complicated, and lighter in weight than conventional mechanisms. More particularly, the invention provides a ring gear that "floats" upon a planetary gear set, free of a center hub and a bearing connection to a drive shaft.

BRIEF DESCRIPTION OF THE DRAWINGS

FIG. 12 is a diagrammatic view of a representative control system for the steering and propulsion mechanism that embodies the features of the invention.

DETAILED DESCRIPTION OF A PREFERRED EMBODIMENT

Figure 1:
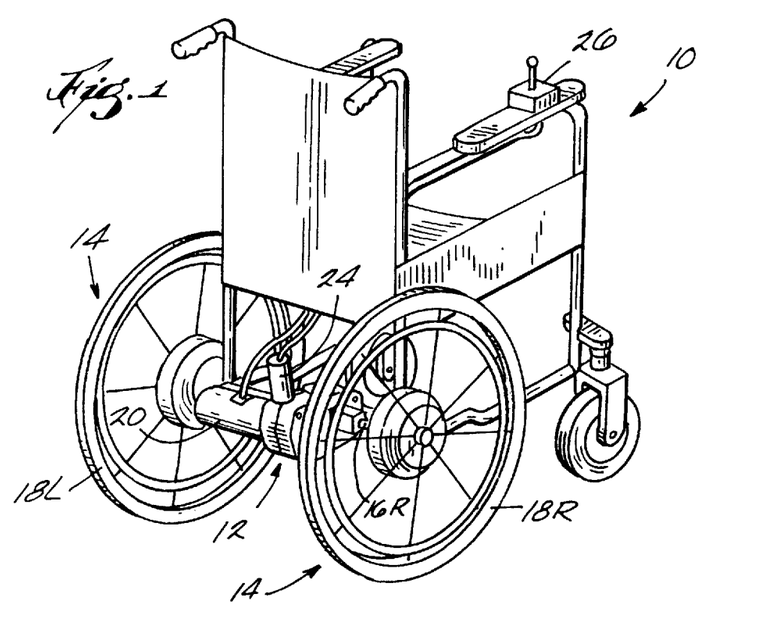
FIG. 1 is a perspective view of a wheel chair vehicle having a mechanism to propel and steer the vehicle according to the features of the invention.

FIG. 1 shows a wheeled vehicle 10 having a mechanism 12 that both propels and steers the vehicle 10.

FIG. 1 shows the vehicle 10 as a motorized wheel chair. This is because the mechanism 12 is well suited for use with smaller vehicles, like a golf cart, or a motorized wheel chair, or a motorized personal mobility scooter. Still, the mechanism 12 is suitable for use in other environments and larger vehicles, too. For example, the mechanism 12 can be used for propelling and steering bulldozers, military tanks, forklift trucks, mining machines, and amphibious vehicles.

Figure 2:
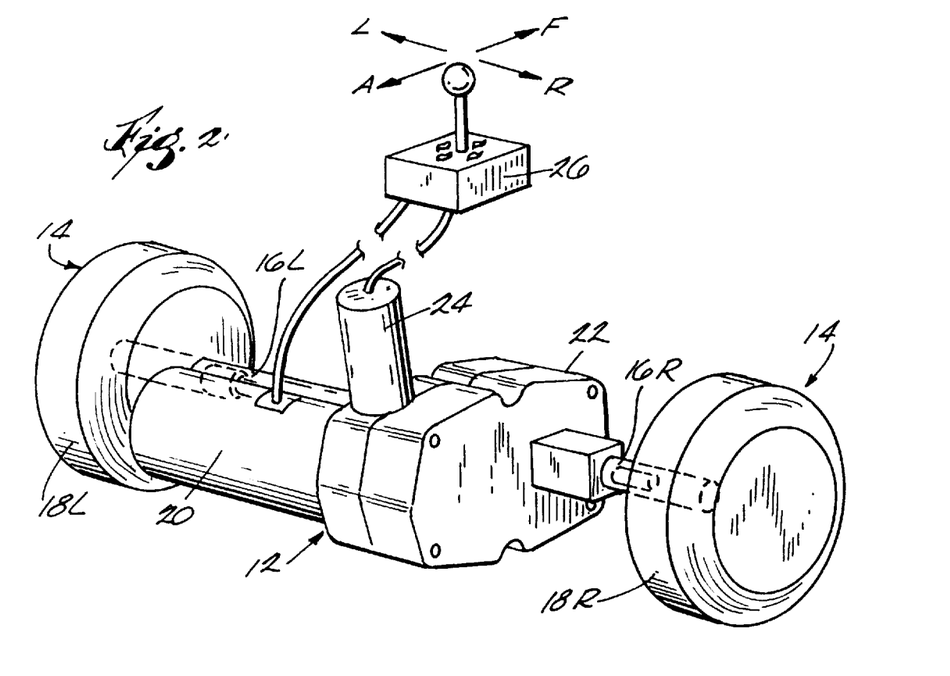
FIG. 2 is an enlarged perspective view of the vehicle steering and propelling mechanism shown in FIG. 1 enclosed within a protective housing secured to the vehicle.
Figure 3:
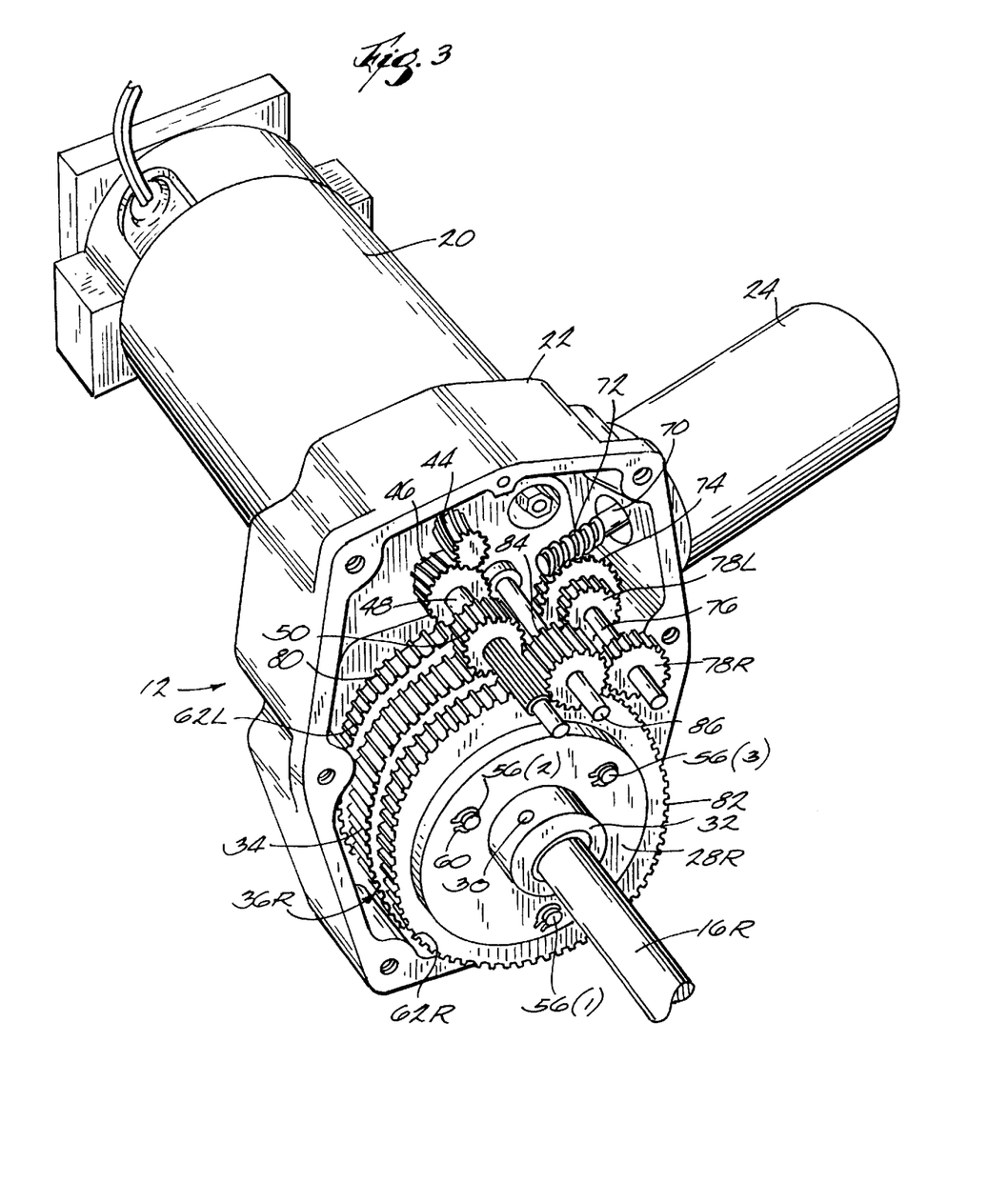
FIG. 3 is a further enlarged perspective view of the steering and propelling mechanism shown in FIG. 2 with a part of the housing removed to expose the working parts of the mechanism.
Figure 4:
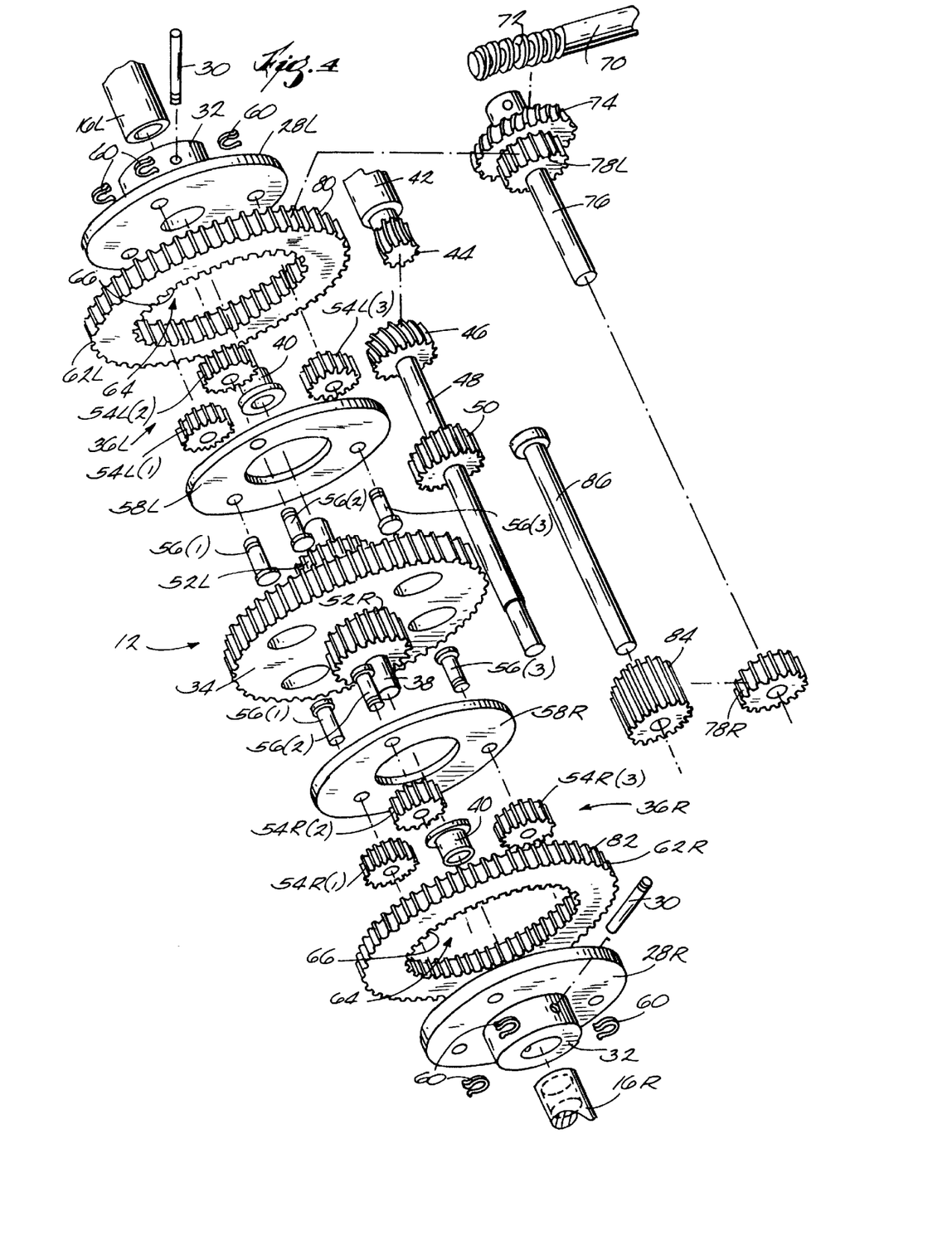
FIG. 4 is an exploded perspective view of the steering and propelling mechanism shown in FIG. 3, after having been removed from the protective housing.

In use (also see FIG. 2), the mechanism 12 is enclosed within a protective housing 22 secured to the vehicle 10. FIG. 3 shows a part of the housing 22 removed to expose the working parts of the mechanism 12. FIG. 4 shows the working parts of the mechanism 12 in an exploded view outside the housing 22.

The mechanism 12 propels the vehicle 10 by imparting rotation from a drive motor 20 to one or more propulsion elements 14. As FIG. 2 shows, the propulsion elements 14 in the illustrated embodiment comprise left and right drive shafts 16L and 16R, each carrying a drive wheel 18L and 18R.

It should be appreciated that the propulsion elements 14 driven by the mechanism 12 can take other forms. The propulsion elements 14 can comprise track drives, or water wheels or rotatable pontoons provided with auger-like surface projections for propelling a boat.

The mechanism 12 steers the vehicle by imparting different rates of rotation to the left and right drive shafts 16L and 16R, as commanded by an auxiliary motor 24. In an alternative embodiment (not shown), a clutch assembly coupled to the main drive motor 20 can be used instead of the auxiliary motor 24 to impart different rates of rotation to steer the vehicle 10.

A controller 26 is electrically coupled to the main drive motor 20 and the auxiliary motor 24. The controller 26 is shown in FIGS. 1 and 2 as a joystick, although other analog or digital control devices can be used.

When the controller 26 is located in its neutral position, shown in FIG. 1, neither motor 20 nor 24 is actuated. Fore and aft movement of the controller 26 (designated, respectively, by arrows F and A in FIG. 2) actuates the main drive motor 20 to propel the vehicle, respectively, forwards and backwards. The speed of the drive motor 20, and thus the speed of forward or rearward travel, increases as a function of the fore or aft distance of the controller 26 from the neutral position.

Left and right movement of the controller 26 (designated, respectively, by arrows L and R in FIG. 2) actuates the auxiliary motor 24. Left movement of the controller 26 causes the right drive shaft 16R to rotate faster than the left drive shaft 16L. Conversely, right movement of the controller 26 causes the left drive shaft 16L to rotate faster than the right drive shaft 16R.

Referring now principally to FIGS. 3 and 4, the mechanism 12 includes drive plates 28L and 28R. Drive plate 28L is associated with the drive shaft 16L. Drive plate 28R is associated with the drive shaft 16R. Each drive shaft 16L/R is coupled by a pin 30 to the center hub 32 of its associated drive plate 28L/R. Rotation of the drive plates 28L/R rotates the associated drive shafts 16L/R.

The mechanism 12 further includes a main drive gear 34 (see FIG. 4). The main drive gear 34 is supported for rotation on a shaft 38 between the drive plates 28L/R. The ends of the shaft 38 are carried in bushings 40 in the central hub 32 of the drive plates 28L/R for rotation independent the drive plates 28L/R. By virtue of this construction, the drive gear 34 and drive plates 28L/R can rotate at different rates of rotation.

The drive motor 20 includes an output shaft 42 carrying an output gear 44. The output gear 44 is coupled to a transfer gear 46 to impart rotation to a transfer shaft 48. A transfer drive gear 50 carried for rotation on the transfer shaft 48 is coupled to the main drive gear 34. Through this linkage, the motor 20 imparts rotation to the main drive gear 34.

The main drive gear 34 is coupled to the drive plates 28L/R by planetary gear sets 36L/R. Planetary gear set 36L is associated with drive plate 28L. Planetary gear set 36R is associated with drive plate 28R.

The planetary gear sets 36L/R includes sun gears 52L/R carried by the main gear shaft 38 on opposite sides of the main gear 34. The sun gears 52L/R rotate on the shaft 38 in common with the main gear 34.

The planetary gear sets 36L/R further include an array of planet gears coupled to each sun gear 52L/R. In the illustrated embodiment, there are three planet gears (designated 54L(1–3) and 54R(1–3) in each planetary gear set 36L/R. The planet gears 54L(1–3) and 54R(1–3) rotate about pins 56 (1–3) between a respective drive plate 28L/R and a back plate 58L/R. Lock washers 60 secure the ends of the pins 56.

Rotation of the sun gears 52L/R with the main gear 34 impart rotation of the planet gears 54L(1–3) and 54R(1–3) about their respective pins 56. The planet gears 54L(1–3) and 54R(1–3) rotate as a group about the their respective sun gear 52L/R. This, in turn, imparts rotation to the drive plates 28L/R and back plates 58L/R through the pins 56 carrying the planet gears 54L(1–3) and 54R(1–3).

In this way, the mechanism 12 transfers rotation from the single drive motor 20 to the drive gear 34 to each sun gear 52L/R, and then to each drive shaft 16L/R through the planet gears 54L(1–3) and 54R(1–3). Fore and aft movement of the controller 26 governs the direction and speed of rotation of the drive gear 34.

It should be apparent that the drive ratio between the drive motor 20 and the drive shafts 16L/R can be adjusted, as desired, by reducing the diameter of the drive gear 40 and increasing the diameter of the transfer gear 50, or vice versa.

The mechanism 12 further includes a ring gear 62L/R coupled to each planetary gear set 36L/R. As FIG. 4 best shows, each ring gear 62L/R is carried by the respective planetary gear set 36L/R, between the associated drive plate 28L/R and back plate 58L/R.

As FIG. 4 best shows, each ring gear 62L/R has an annular opening 64. The interior periphery of the annular opening 64 forms a gear surface 66. The gear surface 66 engages the planet gears 54L(1–3) and 54R(1–3).

The planet gears 54L(1–3) and 54R(1–3) and pins 56 (1–3) provide the only radial support for the ring gears 62L/R. The ring gears 62L/R thereby "float" upon the respective planet gears 54L(1–3) and 54R(1–3) free of connection to either the associated drive plate 28L/R or back plate 58L/R. Nevertheless, the adjacent structures of the associated drive plate 28L/R and back plate 58L/R physically extend radially far enough beyond the interior periphery of the annular opening 64 to block axial movement of the ring gears 62L/R. The adjacent structures of the associated drive plate 28L/R and back plate 58L/R thereby serve to restrict axial movement of floating ring gears 62L/R, without impeding rotation of the ring gears 62L/R.

Thus, as the planet gears 54L(1–3) and 54R(1–3) radially support the ring gears 62L/R during rotation, the adjacent drive plates 28L/R and back plates 58L/R keep the floating ring gears 62L/R in desired axial alignment with the planet gears 54L(1–3) and 54R(1–3). In this arrangement, by axially retaining the ring gears 62L/R, the drive plates 28L/R and back plates 58L/R serve as thrust bearings for the mechanism 12.

By virtue of this construction, the floating ring gears 62L/R do not have nor do they require a center support shaft, either for radial support or for axial restraint. The annular opening 64 of the ring gears 62L/R is, as a consequence, open and free of any structure such as a center hub, bearing, or bushing. Lighter weight and less complexity result in a smaller space.

Figure 5:
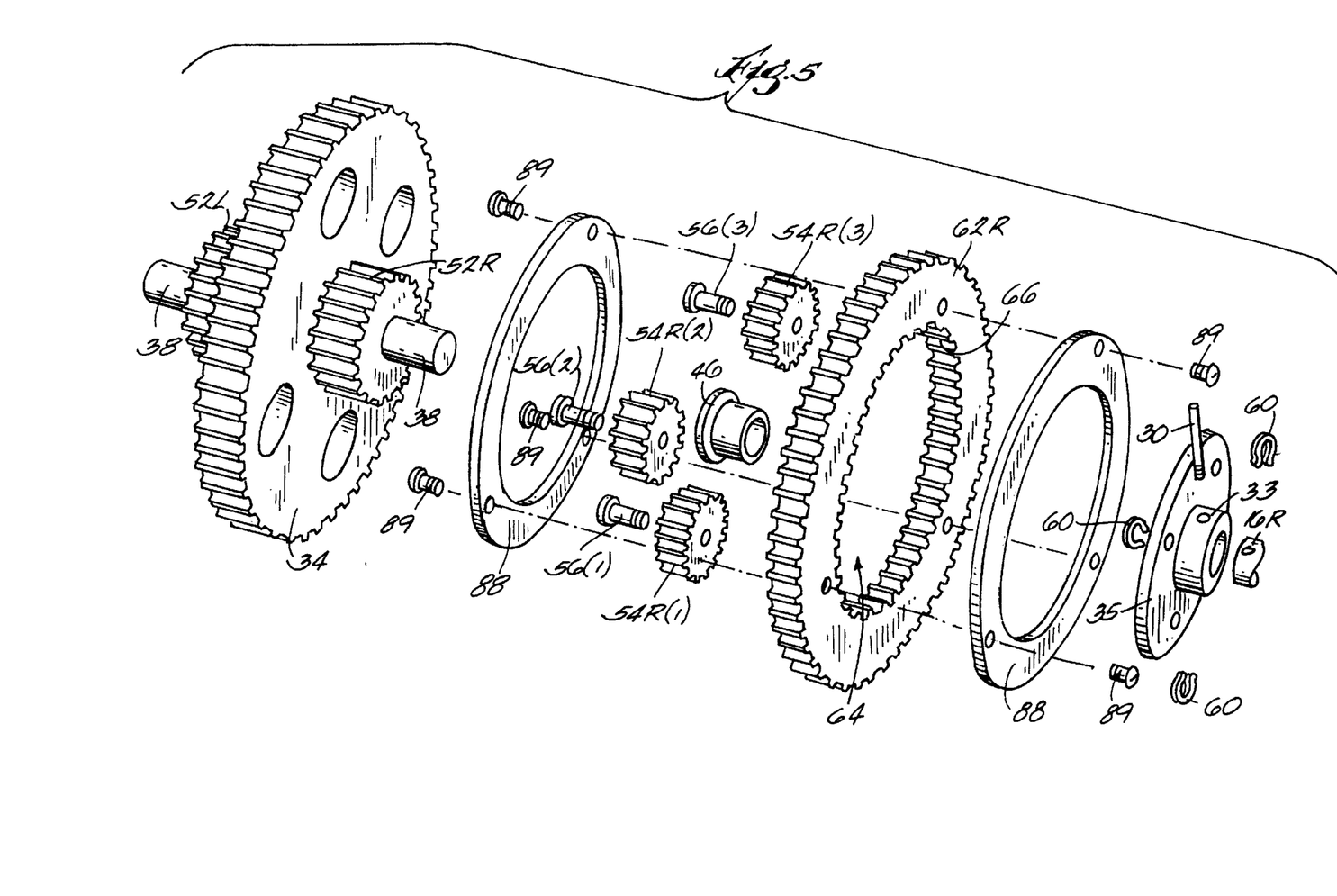
FIG. 5 is an exploded perspective view of an alternative embodiment of a steering and propelling mechanism that embodies the features of the invention.
Figure 6:
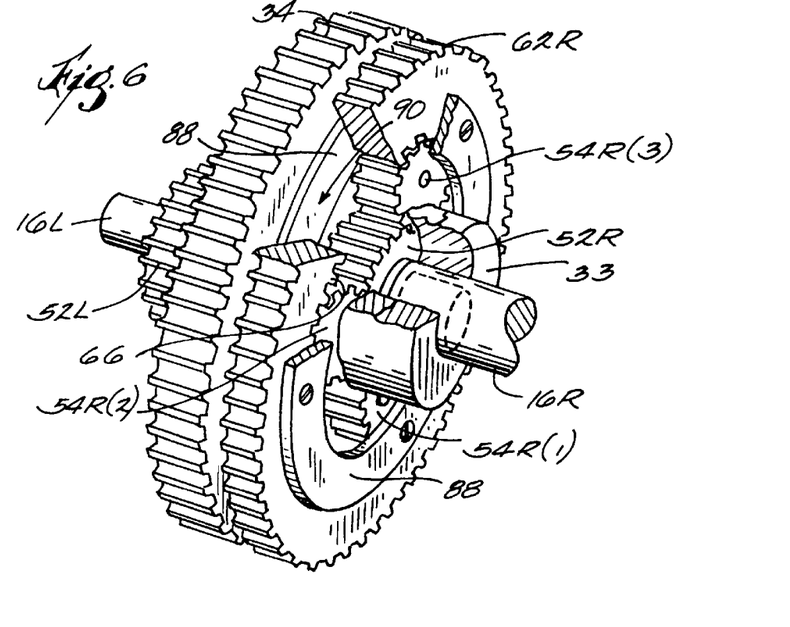
FIG. 6 is an assembled view of the alternative embodiment of a steering and propelling mechanism shown in FIG. 5.
Figure 7:
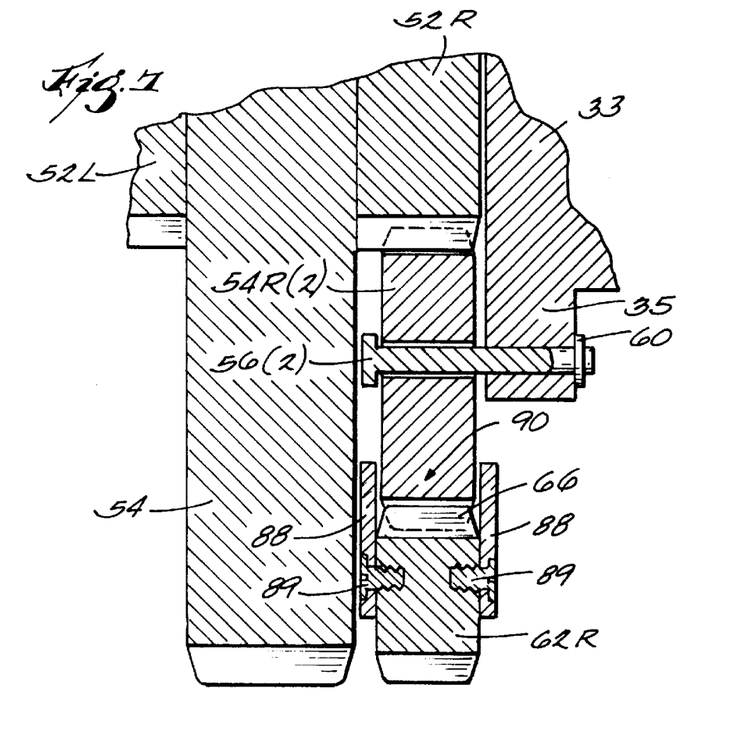
FIG. 7 is a sectional view of a portion of the alternative embodiment of a steering and propelling mechanism shown in FIG. 6.

FIGS. 5 to 7 show an alternative way of axially retaining the ring gears 62L/R while floating about the planet gears 54. In this arrangement, a pair of circumferential skirt plates 88 are fixed by pins 89 (or, alternatively, by welding) alongside the interior gear surface 66 of the respective ring gear 62L/R.

In this arrangement, the drive shafts 16L/R are secured by pins 30 to a coupling 33, which also carries the main drive shaft 38 via the bushings 40. The planet gears 54L(1–3) and 54R(1–3) rotate about the pins 56 (1–3) secured by lock washers 60 to a flange 35 on the coupling 33 (the flange 35 has been removed in FIG. 6 to provide a better view of the engagement between the sun gear 52R and the planet gears 54R(1–3)).

As FIGS. 6 and 7 best show, the skirt plates 88 extend slightly beyond the periphery of the respective gear surface 80/82. The skirt plates 88 define between them a channel 90 in which the associated planet gears 54L(1–3) and 54R(1–3) rest in engagement the interior gear surface 66. The skirt plates 88 restrict axial movement of the floating ring gears 62L/R relative to the planet gears 54L(1–3) and 54R(1–3), without impeding rotation of the ring gears 62L/R about the planet gears 54L(1–3) and 54R(1–3). If the skirt plates 88 inner diameter coincide approximately with the pitch diameters of the gears 54(1–3), the relative motion is very low, thus improving efficiency.

Figure 8:
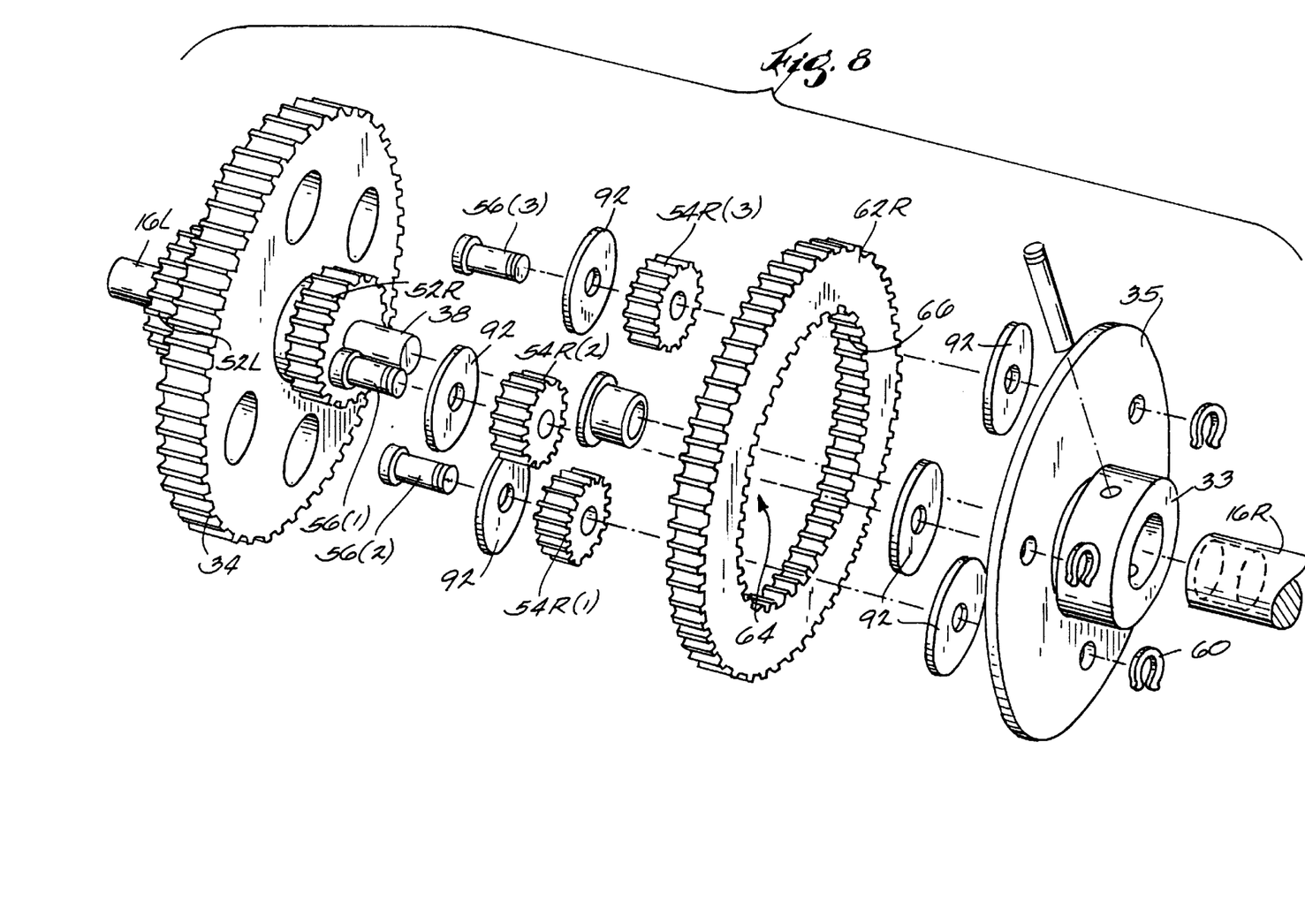
FIG. 8 is an exploded perspective view of another alternative embodiment of a steering and propelling mechanism that embodies the features of the invention.
Figure 9:
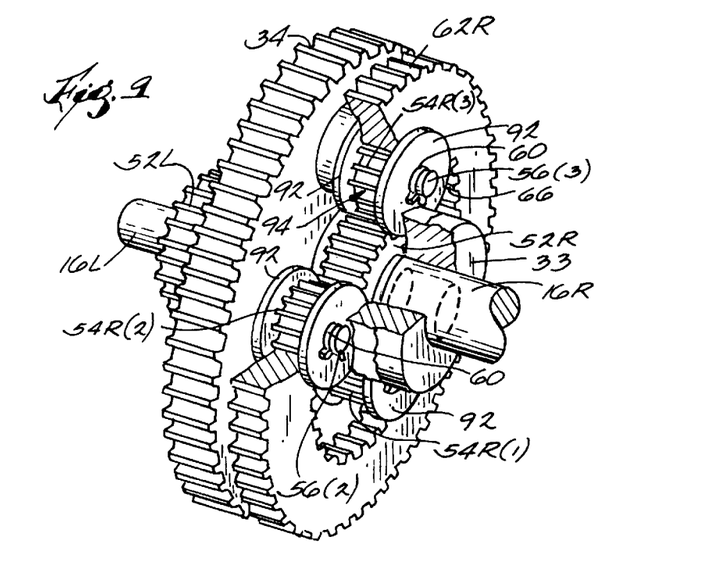
FIG. 9 is an assembled view of the alternative embodiment of a steering and propelling mechanism shown in FIG. 8.
Figure 10:
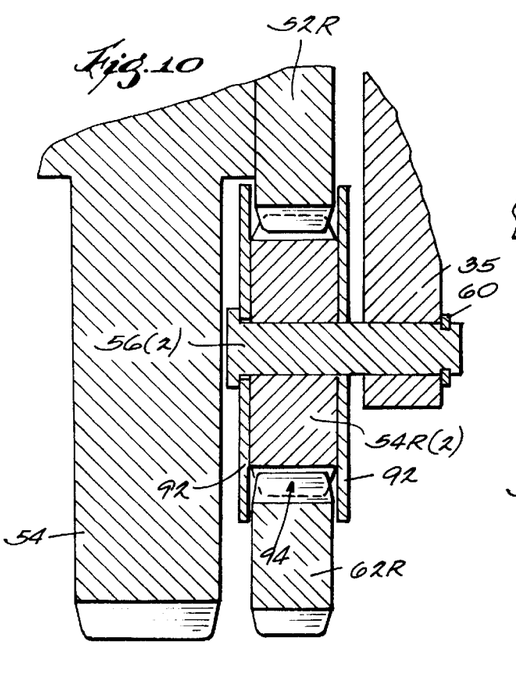
FIG. 10 is a sectional view of a portion of the alternative embodiment of a steering and propelling mechanism shown in FIG. 9.

FIGS. 8 to 10 show another alternative way of axially retaining the ring gears 62L/R while floating about the planet gears 54. In this arrangement, the pins 56(1–3) carry washers 92 along opposite sides of each planet gear 54L (1–3) and 54R(1–3). As in the embodiment shown in FIGS. 5 to 7, the pins 56 (1–3) are secured by lock washers 60 to a flange 35 on the coupling 33 (as in FIG. 6, the flange 35 has been removed in FIG. 9 to provide a better view of the engagement between the sun gear 52R and the planet gears 54R(1–3)).

As FIGS. 9 and 10 best show, the washers 92 extend slightly beyond the periphery of the gear surfaces of the planet gears, defining between them a channel 94 in which the associated ring gears 62L/R rest while in engagement with the planet gears. As in the preceding embodiments, the opposed washers 92 restrict axial movement of the floating ring gears 62L/R relative to the planet gears 54L(1–3) and 54R(1–3), without impeding rotation of the ring gears 62L/R about the planet gears 54L(1–3) and 54R(1–3).

Figure 11:
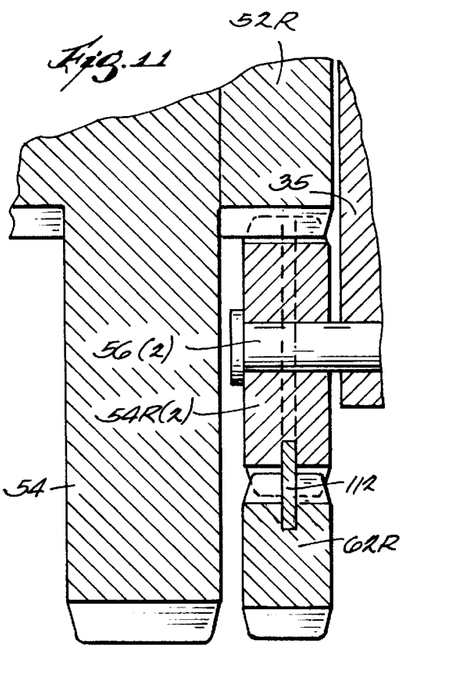
FIG. 11 is a sectional view of a portion of yet another alternative embodiment of a steering and propelling mechanism that embodies the features of the invention.

FIG. 11 shows yet another alternative way of axially retaining the ring gears 62L/R while floating about the planet gears 54. In this arrangement, the interior gear surfaces 66 of the ring gears 62L/R each carries a press-fitted key 112. The key 112 registers within a keyway 114 formed in each planet gear 54R(1–3) and 54L(1–3). The keyway 114 is slightly larger than the key 112 to permit circumferential movement of the key 112 through the keyway 114 as the ring gear 62L/R rotates about the planet gears 54R(1–3)/54L (1–3). Still, the keyway 114 restrict axial movement of the floating ring gears 62L/R relative to the planet gears 54L (1–3) and 54R(1–3), without impeding rotation of the ring gears 62L/R about the planet gears 54L(1–3) and 54R(1–3).

Regardless of how the ring gears 62L/R are axially restrained, the auxiliary motor 24 imparts additional rotation to the floating ring gears 62L/R circumferentially about the planet gears 54L(1–3) and 54R(1–3). This additional rotation has an additive or subtractive effect upon the rate of rotation imparted by the planet gears 54L(1–3) and 54R (1–3) to the drive shafts 16L/R. These additive or subtractive rotational effects imparted by the auxiliary motor 24 through the ring gears 62L/R steer the vehicle 10.

Referring back to the embodiment shown in FIGS. 3 and 4, the auxiliary motor 24 includes an output shaft 70 carrying an output gear 72. The output gear 72 is coupled to a transfer gear 74 to impart rotation to a transfer shaft 76. Two transfer drive gears 78L and 78R are carried for rotation on the transfer shaft 76. The first transfer gear 78L is coupled to the peripheral gear surface 80 of the ring gear 62L. The second transfer gear 78R is coupled to the peripheral gear surface 82 of the ring gear 62R, through an intermediate transfer gear 84 supported on intermediate transfer shaft 86.

This arrangement imparts rotation from the auxiliary motor 24, via the output gear 72 and transfer gears 78L, to the ring gear 62L. At the same time, rotation is imparted, via the transfer gears 78R and 84 to the ring gear 62R. The presence of the intermediate gear 84 imparts opposite rotational directions to the ring gears 62L/R. The directions are governed by left or right movement of the controller 26, as previously explained. However, the speed of rotation for each ring gear 62L/R occasioned by left or right movement of the controller 26 will be the same.

More particularly, assume for the moment that the controller 26 is in its neutral position, so that neither the drive motor 20 nor the auxiliary motor 24 is actuated. The vehicle 10 is stationary. Movement of the controller 26 to the left actuates the motor 24 to impart counterclockwise rotation to the ring gear 64L, while imparting clockwise rotation to the other ring gear 64R. The speed of rotation will be the same for each ring gear 64L/R. Rotation of the ring gears 64L/R will, in turn, impart common rotation to the respective drive plate 28 through the respective planet gears 54L(1–3) and 54R(1–3). The vehicle spins about its center point, without forward or rearward movement to the left (i.e. counterclockwise).

With the vehicle 10 stationary, movement of the controller 26 to the right has the opposite effect. The motor 24 imparts clockwise rotation to the ring gear 64L, while imparting counterclockwise rotation to the other ring gear 64R. The speed of rotation will be the same for each ring gear 64L/R. Rotation of the ring gears 64L/R will, in turn, impart common rotation to the respective drive plate 28 through the respective planet gears 54L(1–3) and 54R(1–3). The vehicle spins about its center point, without forward or rearward movement, to the right (i.e. clockwise).

Assume now that the vehicle 10 is first stationary, and the controller 26 is then moved forward. The motor 20 is actuated, which imparts forward movement to the vehicle via the drive gear 34 and planetary gear sets 36L/R to the drive plates 28 and shafts 16L/R. Concurrent movement of the controller 26 to the left actuates the auxiliary drive motor 24, causing counter rotation of the ring gears 64L/R as before described. The counterclockwise rotation of the ring gear 64L will have the effect of reducing the rate of rotation of the associated planet gears 54L (1–3), and thus the associated drive plate 28L and shaft 16L, by an amount equal to the rate of rotation of the ring gear 64L (imparted by the motor 24). At the same time, the clockwise rotation of the ring gear 64R will have the opposite effect of increasing the rate of rotation of the associated drive plate 28R and shaft 16R (imparted by the motor 20), again by the amount of the rate of rotation of the ring gear 64R (imparted by the motor 24). The vehicle 10 turns left.

Likewise, with the motor 20 is actuated to impart forward movement to the vehicle 10, concurrent movement of the controller 26 to the right actuates the auxiliary drive motor 24, causing counter rotation of the ring gears 64L/R as before described. The clockwise rotation of the ring gear 64L will have the effect of increasing the rate of rotation of the associated drive plate 28L and shaft 16L (imparted by the motor 20) by the rate of rotation of the ring gear 64L (imparted by the motor 24). At the same time, the counter-clockwise rotation of the ring gear 64R will have the effect of decreasing the rate of rotation of the associated drive plate 28R and shaft 16R (imparted by the motor 20) by the rate of rotation of the ring gear 64R (imparted by the motor 24). The vehicle 10 turns right.

In either a left or right turn, the radius of the turn will depend upon the speed of forward movement imparted by the drive motor 20. The higher the speed of forward movement is, the larger the turning radius of the vehicle 10 will be. Conversely, the lower the speed of forward movement is, the smaller the turning radius of the vehicle 10 will be. This provides inherent steering stability for the vehicle 10. Furthermore, steering occurs without a loss of motive power, since the speed of one wheel is reduced while the speed of the other wheel is increased by the same increment, maintaining the average speed of the vehicle 10.

It should be appreciated that the use of the transfer gear 78R could be eliminated by increasing the axial lengths of the transfer gear 78L and intermediate gear 84.

In an alternative embodiment, the transfer gear 78R and associated intermediate gear 84 and shaft 86 can be eliminated, and ring gear 62R locked in place. In this embodiment, the motor 24 would applying steering forces from only one side by imparting rotation to the ring gear 62L in the manner described above. This arrangement, while reducing overall complexity, would not have the inherent steering stability that two-sided, counter rotation steering provides.

The main gear 34, the sun gears 52, the planet gears 54, and most of the transfer gears 50; 78; and 84 shown in FIGS. 3 and 4 all comprise straight spur gear surfaces. This arrangement minimizes axial thrust forces, reducing or eliminating the need for sophisticated bearings. The use of only straight spur gear surfaces also makes possible the consolidation of production molds, as most of the spur gears 52; 54; 50; 78; and 84 can be made interchangeable, with equal diameters and, thus, capable of sharing common production molds.

The use of straight spur gear surfaces is most appropriate in applications having relatively lower speeds of rotation, or where mechanical noise is not a factor. In applications where higher speeds are required, or where less mechanical noise is desired, the use of helical spur gears is recommended (of the type shown in FIGS. 3 and 4 for the motor output gears 44 and 72 and mating transfer gears 46 and 74). In these applications, it is most desirable that the main drive gear 34 and its mating transfer gear 50 also comprise helical spur gear surfaces. If helical spur gears are used, greater attention to material selection and lubrication may be required for the mechanism 10, because of increased axial loads, particularly in the region of the floating ring gears 62L/R.

In the preceding embodiments, all steering forces are applied to the ring gears 62L/R via the transfer gears 78L/R and 84 at right angles to the axis of rotation of the ring gears 62L/R. The creation of axial loads on the mechanism 10 in the application of steering forces is thereby lessened.

It should be understood, also, that steering forces could be applied to the ring gears 62L/R using a conventional beveled gear arrangement. In this arrangement (not shown) the peripheral gear surfaces 80 and 82 would be oppositely beveled and operatively coupled to a single, mating, oppositely beveled steering gear driven by the auxiliary motor 24. The axis of rotation of the beveled steering gear would be perpendicular to the axis of rotation of the ring gears to apply rotational force parallel to the rotational axis of the ring gears. The oppositely beveled steering gear 96 would provide the same counter rotation, two sided steering action through the ring gears 62L/R as already described. Of course, a single beveled steering gear (not shown) could be provided to impart rotation to only one ring gear (also beveled) to provide one sided steering action, as already described.

FIG. 12 shows a representative control system 98 coupled to the controller 26 for actuating the main drive motor 20 and auxiliary steering motor 24 to propel and steer the vehicle 12 using the mechanism 10 described above.

The system 98 includes a drive motor controller 100 and a steering motor controller 102 coupled, respectively, to the drive motor 20 and the steering motor 24. The output of a read only memory element 104 is coupled to the controllers 100 and 102. The input of the read only memory element 104 is coupled to the joystick controller 26. The read only memory element 104 retains the prescribed look up table associating input signals from the controller 26 to output commands to the motor controllers 100 and 102.

In the illustrated embodiment, the joystick controller 26 includes a potentiometer 106 or the like that generates analog signal outputs indicating direction in response to movement of the controller 26 (forward, neutral, or reverse). The potentiometer 106 also generates voltage signals that vary according to joystick distance from the neutral position, which provide speed commands.

The memory element 104 transforms the analog signals from the controller potentiometer 106 to preestablished command signals, which are sent to the drive motor controller 100. In the illustrated embodiment, the controller 100 comprises a pulse width modulation circuit. The controller 100 varies the pulse width of the current supplied to the motor 20 according to preestablished command signals received from the memory element 104 to impart forward and reverse travel at the commanded speed.

The joystick controller 26 includes a micro switch 108 or an optical coupling device that provides digital signals based upon movement of the joystick controller 26 left or right of the neutral position. The memory element 104 transforms the digital signals from the controller micro switch into preestablished command signals, which are sent to the steering motor controller 102. In the illustrated embodiment, the controller 102 comprises a full H-Bridge driver. The controller 102 transmits the commanded rotational command (clockwise or counterclockwise) to the motor 24, to impart the desired steering direction.

In a preferred implementation, the controller 102 also includes a pulse width modulation circuit. This circuit varies the pulse width of current to the motor 24 according to a prescribed function, to uniformly ramp up the speed of the motor 24 to a preset maximum to avoid jerkiness during steering.

The foregoing describes one particular method of control. It should be appreciated that the method of control of the present invention is not limited to the described method. Due to the nature of the present invention, its control mechanism to control motion in all four quadrants of an horizontal plane can be any analog or digital mechanism which can be described and characterized through the use of differential equations and control theory. The control mechanism can be as simple as using switches or other open loops for rough motion control and positioning, or as sophisticated as to include optical and electrical feedback loops, and processor control for very precise and smooth motion control and positioning. In addition, the driving motors are not limited to permanent magnet direct current motors. It should be appreciated that any form of torsion mechanism which can cause movement of the internal gears can be used to drive and steer the present invention.

It should also be appreciated that, alternatively, a manual steering drive shaft could be used to impart rotation to one or more of the ring gears 62L/R to steer the vehicle 10, instead of electrically steering the vehicle 10 using the auxiliary motor 24. Powered steering could also still be accomplished without using the auxiliary motor 24 by imparting rotation to one or more of the ring gears 62L/R through a clutch system coupled to the main drive shaft 38.

As described above, the mechanism 10 provides power input to a sun gear and takes power output from the associated array of planet gears. It should be appreciated that, alternatively, the power input can be provided either to an array of planet gears, or to a ring gear (see, for example, U.S. Pat. No. 4,813,506, the teachings of which are incorporated by reference herein). The output drive shafts can be operatively connected to any one of the sun gear, the planet gears, or the ring gear. Similarly, the input drive gear or the steering gear can be operatively connected to any one of the sun gear, the planet gears, or the ring gear.

While preferred embodiments of the invention have been described for purposes of illustration, it should be understood that further modifications will be apparent to those skilled in the art without departing from the spirit and scope of the appended claims.

I claim:

1. A drive mechanism comprising
   a ring gear having an open annular space free of any interior structure, the open annular space being peripherally bounded soley by an interior peripheral gear surface and being otherwise free of a bearing surface,
   a sun gear rotatable within the open annular space of the ring gear about a rotational axis, and
   a planetary gear set presenting an exterior peripheral gear surface and being otherwise free of a bearing surface, the exterior peripheral gear surface of the planetary gear set operatively meshing with the sun gear within the open annular space of the ring gear for rotation about the sun gear, the exterior peripheral gear surface of the planetary gear set also operatively meshing with the interior peripheral gear surface of the ring gear to radially support the ring gear for rotation about the sun gear, the operative meshing of the exterior peripheral gear surface of the planetary gear set with the interior peripheral gear surface of the ring gear providing the sole radial support for the ring gear.

2. A drive mechanism comprising
   a ring gear having an open annular space free of any interior structure, the open annular space being peripherally bounded solely by an interior gear surface and being otherwise free of a bearing surface, the ring gear also including an outer peripheral gear surface,
   a sun gear rotatable within the open annular space of the ring gear about a rotational axis,
   a planetary gear set presenting an exterior peripheral gear surface and being otherwise free of a bearing surface, the exterior peripheral gear surface of the planetary gear set operatively meshing with the sun gear within the open annular space of the ring gear for rotation about the sun gear, the exterior peripheral gear surface of the planetary gear set also operatively meshing with the interior peripheral gear surface of the ring gear to radially support the ring gear for rotation about the sun gear, the operative meshing of the exterior peripheral gear surface of the planetary gear set with the interior peripheral gear surface of the ring gear providing the sole radial support for the ring gear, and
   a gear operatively meshing with the outer peripheral gear surface of the ring gear to impart rotation to the ring gear.

3. A drive mechanism comprising
   a ring gear having an open annular space free of any interior structure, the open annular space being peripherally bounded solely by an interior gear surface and being otherwise free of a bearing surface, the ring gear including opposite side edges,
   a sun gear rotatable within the open annular space of the ring gear about a rotational axis,
   a planetary gear set presenting an exterior peripheral gear surface and being otherwise free of a bearing surface, the exterior peripheral gear surface of the planetary gear set operatively meshing with the sun gear within the open annular space of the ring gear for rotation about the sun gear, the exterior peripheral gear surface of the planetary gear set also operatively meshing with the interior peripheral gear surface of the ring gear to radially support the ring gear for rotation about the sun gear, the operative meshing of the exterior peripheral gear surface of the planetary gear set with the interior peripheral gear surface of the ring gear providing the sole radial support for the ring gear, and
   restrainers located proximate each side edge of the ring gear to restrain movement of the ring gear axially along the rotational axis without impeding rotation of the ring gear.

4. A drive mechanism comprising
   a ring gear having an open annular space free of any interior structure, the open annular space being peripherally bounded solely by an interior gear surface and being otherwise free of a bearing surface, the ring gear including an outer peripheral gear surface, the ring gear also including opposite side edges,
   a sun gear rotatable within the open annular space of the ring gear about a rotational axis,
   a planetary gear set presenting an exterior peripheral gear surface and being otherwise free of a bearing surface, the exterior peripheral gear surface of the planetary gear set operatively meshing with the sun gear within the open annular space of the ring gear for rotation about the sun gear, the exterior peripheral gear surface of the planetary gear set also operatively meshing with the interior peripheral gear surface of the ring gear to radially support the ring gear for rotation about the sun gear, the operative meshing of the exterior peripheral gear surface of the planetary gear set with the interior peripheral gear surface of the ring gear providing the sole radial support for the ring gear,
   a gear operatively meshing with the outer peripheral gear surface of the ring gear to impart rotation to the ring gear, and
   restrainers located proximate each side edge of the ring gear to restrain movement of the ring gear axially along the rotational axis without impeding rotation of the ring gear.

5. A drive mechanism according to claim 3 or 4 wherein the restrainers are carried by the side edges of the ring gear for common rotation with the ring gear.

6. A drive mechanism according to claim 3 or 4 wherein the restrainers comprise end plates which carry the planetary gear set between them for common rotation with the planetary gear set.

7. A drive mechanism according to claim 3 or 4 wherein the planetary gear set comprises an array of planet gears, and
   wherein the restrainers are carried by at least one of the planet gears.

8. A drive mechanism according to claim 7 wherein each planet gear carries the restrainers.

9. A drive mechanism comprising
   a ring gear having an open annular space free of any interior structure, the open annular space being peripherally bounded solely by an interior gear surface and being otherwise free of a bearing surface, the ring gear also including an outer peripheral gear surface, a sun gear rotatable within the open annular space of the ring gear about a rotational axis, a planetary gear set presenting an exterior peripheral gear surface and being otherwise free of a bearing surface, the exterior peripheral gear surface of the planetary gear set operatively meshing with the sun gear within the open annular space of the ring gear for rotation about the sun gear, the exterior peripheral gear surface of the planetary gear set also operatively meshing with the interior peripheral gear surface of the ring gear to radially support the ring gear for rotation about the sun gear, the operative meshing of the exterior peripheral gear surface of the planetary gear set with the interior peripheral gear surface of the ring gear providing the sole radial support for the ring gear, a transfer gear operatively meshing with the outer peripheral gear surface of the ring gear to impart rotation to the ring gear, a first mechanism operatively coupled to one of the sun gear and planetary gear set for rotating the sun gear, the planetary gear set, and the ring gear, and a second mechanism operatively coupled to the transfer gear for rotating the ring gear independently of the first mechanism.

10. A drive mechanism according to claim 9 wherein the ring gear includes side edges, and further including restrainers located proximate each side edge of the ring gear to restrain movement of the ring gear axially along the rotational axis without impeding rotation of the ring gear.

11. A drive mechanism according to claim 10 wherein the restrainers are carried by the side edges of the ring gear for common rotation with the ring gear.

12. A drive mechanism according to claim 10 wherein the restrainers comprise end plates which carry the planetary gear set between them for common rotation with the planetary gear set.

13. A drive mechanism according to claim 10 wherein the planetary gear set comprises an array of planet gears, and wherein the restrainers are carried by at least one of the planet gears.

14. A drive mechanism according to claim 13 wherein each planet gear carries the restrainers.

* * * * *